Sept. 30, 1941.  F. W. SCHWINN  2,257,401
CRANK BEARING FOR BICYCLES
Filed Aug. 2, 1939
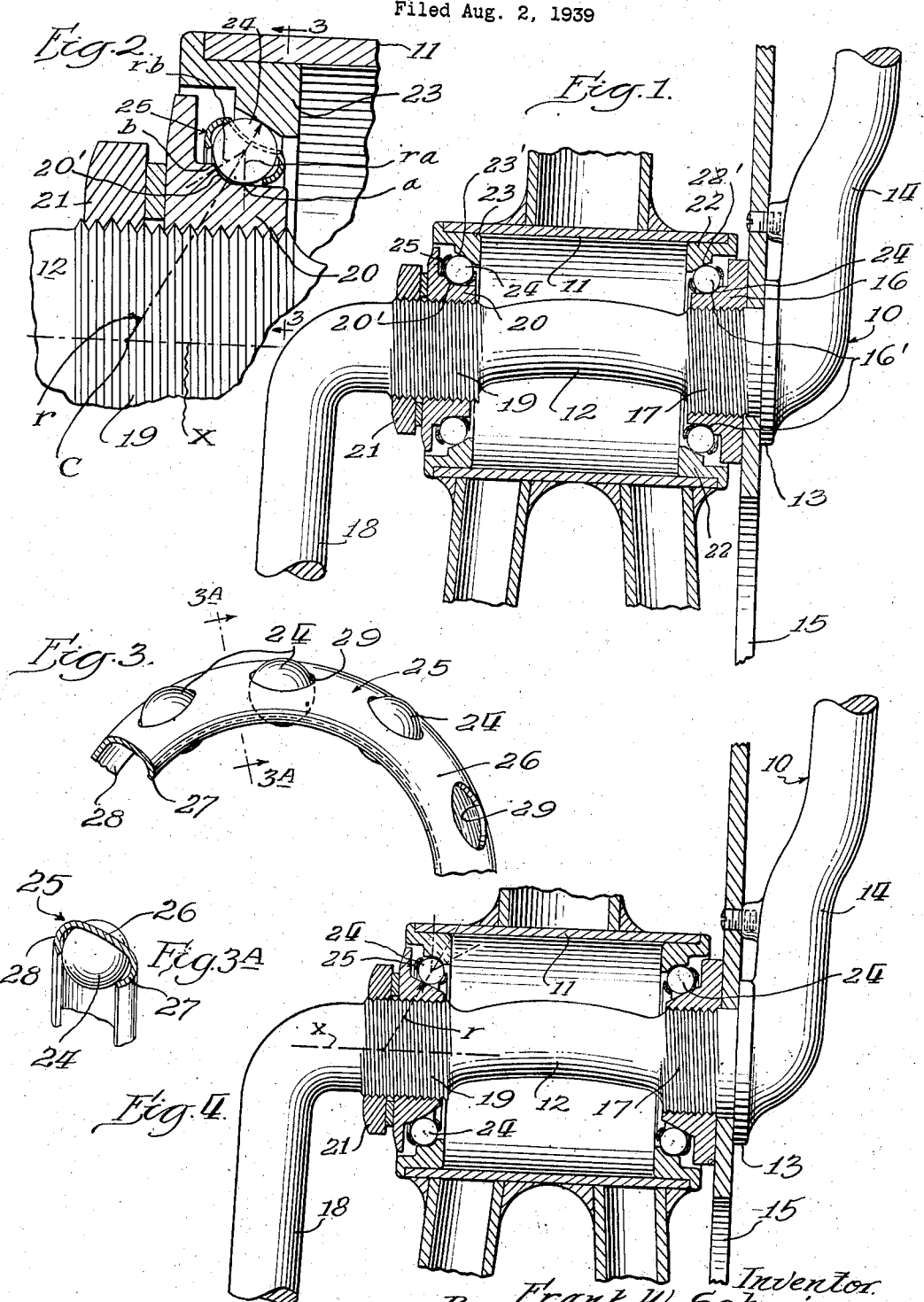
Inventor
Frank W. Schwinn
By Williams, Bradbury,
McCaleb & Hinkle, Attys.

Patented Sept. 30, 1941

2,257,401

UNITED STATES PATENT OFFICE 2,257,401

CRANK BEARING FOR BICYCLES

Frank W. Schwinn, Chicago, Ill.

Application August 2, 1939, Serial No. 287,897

1 Claim. (Cl. 308—179.5)

My invention relates to crank bearings or the like for bicycles, and especially to a self-aligning cup and cone bearing therefor such as the pedal crank bearing.

In the ball bearings usually used for journaling pedal cranks, the bearings are of the cup and cone type. The cones are usually mounted on the shaft portion of the crank by threading them thereonto and locking them with lock nuts. This is to allow adjustment. I have found that, due to the fact that the cone or inner race member is mounted on the crank by screw threads, there is often a definite malalignment of the cone, whereby its plane is not accurately at a normal to the axis of the crank, as should be the case. Thus, when the crank rotates, the cone does not run true, but runs something like a swash plate, giving a slight axial oscillation to certain regions on the cone. This gives an uneven ball bearing support for the journal and causes localized wear.

The general object of my invention is to eliminate the ill effects of such malalignment of the cone. I propose to do this without adding to the complication of the bearing or adding materially to its expense, and still leave the other functions and qualities of the bearing unimpaired.

More specifically, one object of my invention is to provide an adjustable ball bearing mounting for a pedal crank within the crank hanger or head of a bicycle, which bearing will take both end thrusts and radial thrusts, and prevent rocking of the crank within the bearing—but which will allow considerable practical tolerance in the divergence of the crank-carried race members from planes normal to the axis of the crank.

I am aware that ball bearings for radial thrusts have been made with the ball race of an outer race ring spherically convexed to permit some universal rocking of the shaft without impairing the fit of the balls, but such bearings are not suitable for pedal crank bearings because they do not take end thrusts, or they do not prevent rocking of the crank axis, or they are not susceptible of being made adjustable to take up wear.

By my invention I have accomplished my objective by a simple change in the cups only, without substantially increasing the cost of, or adding complications to, the bearing and without change in the other parts now customarily used in pedal crank bearings. The latter feature has the practical advantage of interchangeability with present bicycle parts, thereby avoiding increasing the parts inventories, except the addition of the new cup.

Another object of my invention is a ball retainer peculiarly adapted for this cup and cone type of bearing, since the contour of the ball races makes some kind of retainer necessary for convenient assembly and the conventional designs of ball retainers will not function in this type of bearing.

The foregoing together with further objects, features and advantages of my invention are set forth in the following description of specific embodiments thereof and illustrated in the accompanying drawing, wherein:

Fig. 1 is a diametrical section through the bearing of a pedal crank in a bicycle;

Fig. 2 is an enlarged detail of Fig. 1;

Fig. 3 is a fragmentary elevation of the balls and ball retainer as seen from the line 3—3 of Fig. 2;

Fig. 3A is a cross-section of the retainer taken on the line 3A—3A of Fig. 3; and Fig. 4 is a view similar to Fig. 1 but showing a modified arrangement.

In Fig. 1 I have shown a pedal crank 10 journaled in the crank head or hanger 11 of a bicycle frame.

The shaft portion 12 of the crank carries a sprocket flange 13 at one end adjoining the right crank arm 14. The sprocket 15 is mounted on the shaft portion 12 and lies against the shoulder of the flange 13. The right cone or inner race ring 16 has a threaded bore by means of which it is screwed on to the right threaded section of the shaft portion 12. This both mounts the cone 16 in place and also locks the sprocket on the shaft portion.

Adjoining the left crank arm 18, the shaft portion 12 carries a threaded section 19. The left cone or inner race ring 20 is threaded on to this section 19 and locked in the desired adjusted axial position by a lock nut 21, also threaded on to the section 19.

Right and left cups or outer race rings 22 and 23 are set into the respective ends of the head 11, being positioned in their inward axial movement by shoulders which abut the ends of the head 11.

One annular set of balls is interposed between the right cone 16 and the right cup 22, and a similar annular set of balls 24 is interposed between the left cone 20 and the left cup 23.

The cones 16 and 20 do not have conical ball engaging surfaces. Instead, the cone races are of the concave two-point contact type. Thus, referring for clarity to the enlarged detail section in Fig. 2, the annular ball race 20' of the cone 20 is so contoured in relation to the spherical surface of a ball 24, that the ball makes contact with the ball race 20' at two points a and b. Contact at the point a takes most of the inward or radial thrust, and contact at the point b takes the axial thrust to the right and some of the radial thrust. The corresponding contact point on the ball race 16' of the right cone 16, as will be understood, takes the axial thrust to the left. The two bearing units thus hold the crank against axial movement in either direction.

While still offering what is essentially a two-point contact, the contour of the ball race of the cone may, in practice, follow a radius as great as that of each ball.

The ball races of the cups 22 and 23 are convexly spherical surfaces. That is, the ball face of each cup is—to use a geographical analogy—an inter-parallel band of a spherical surface. The center of the spherical surface is on the axis of the shaft portion. As shown in Fig. 2, this spherical surface is determined by drawing a radius $r$ extending diametrically through one of the balls to bisect radii $ra$ and $rb$ from the center of the ball to the contact points $a$ and $b$, and extended to the axis $x$. The point $c$ where the radius intersects the axis is the center of the spherical surface, and the length of the radius is the distance from the center $c$ to the far side of the ball.

If, because of inaccuracies in cutting the threads in the threaded sections of the shaft portion of the crank, or in the bores of the cones, or for other reasons, the ball engaging races of the cones do not hold the set of balls accurately in a plane at a normal to the axis, but instead permit the set of balls to rotate somewhat after the fashion of the swash plate, the points on the surfaces of the several balls farthest from the center $c$ will continue to fall along the great circle of the spherically convexed ball races of the cups so that each ball will continue to be in contact with both races.

This improvement allows considerable "cocking" of the cones relative to the axis without impairing the operation of the bearing or hastening its wearing. It does not interfere with the usual axial adjustment of the bearing. The improvement requires a structural change only in the cups, the other parts remaining as before. This means that the improvement can be incorporated in existing bicycles merely by substituting new cups. It also means that the other parts may continue to be of existing design, instead of requiring a number of new parts in order to put the the improvement into commercial practice.

In Fig. 4 I have shown a modification in which the two-point contact type of ball face is incorporated in the cup and the inter-parallel spherical band constitutes the ball face of the cone race. In that case, the face is convex rather than concave. This reverse arrangement of Fig. 4 is not the preferred form, however.

Another phase of my invention concerns a retainer ring for these bearings. The contour of the ball engaging faces makes it almost necessary for convenient commercial assembly, to employ a retainer ring. Usual retainer rings, however, will not fit or function in these bearings. Accordingly, I have devised a new design of retainer 25.

The retainer 25 is preferably formed from sheet stock and is in the form of an annulus with a generally channel shaped radial cross-section. The channel cross-section comprises a web 26, an inner flange 27, and an outer flange 28. A set of holes 29 of somewhat lesser diameter than the balls is provided through the web 26.

Prior to assembly of the balls into the retainer, the flanges 27 and 28 of the characteristic channel cross-section are spread farther apart than shown in the drawing. The balls are set into the channels, one ball resting in each hole 29. Then the free edges of the flanges 27 and 28 are pressed toward each other until they contact the balls, which then prevents the balls from falling out of the retainer or from coming out of the holes 29. Thus, on the outer side of the retainer the balls protrude through the holes 29 and on the inner side of the retainer they protrude through the slot or open side of the channel between the edges of the flanges 27 and 28.

Unlike retainers frequently used in thrust bearings, the web of my retainer is not generally cylindrical, but instead is frusto-conical. The angle of the cone face of the web complements the angle of the radius $r$. To state this another way, as viewed in the cross section of Fig. 2, the web of the retainer channel is disposed perpendicular to the axis of a line passing from the axis point C through the center of a ball. Or to state it in still another way, in radial cross section, the retainer is a channel, and the center line of the channel falls along the oblique line $r$. My conically centered retainer, in other words, has its radial section designed about an oblique axis, instead of about a vertical axis as in the instance of a conventional thrust bearing retainer, or about a horizontal axis as in a conventional radial bearing. Thus, those portions of the retainer which protrude beyond the path of the balls come in the open space between the cup and cone where they do not interfere with other parts of the bearing.

Having thus described and illustrated my invention, what I claim is:

For journaling a crank or the like in its hanger, two coaxial combination radial and end thrust ball bearings, each bearing comprising a cone member threaded upon and carried by the crank, a cup member positioned both radially outwardly from and axially inwardly of the cone and carried by the hanger, and a single annular set of balls riding between the cone and cup members, the ball race of one of the members being annularly contoured for substantially two arcuately spaced points of contact with the balls, and the ball race of the other member being annularly contoured as an inter-parallel band or zone of a spherical surface whose center is at the intersection of the axis of the bearings and the extended diameter of a ball, which diameter bisects radii of the ball passing to its respective said contact points, the bearings being axially spaced apart a considerable distance with the centers of said spherical surfaces of said other members of the two bearings more widely spaced apart along the axis and axially outwardly of the planes of the two sets of balls.

FRANK W. SCHWINN.